(12) United States Patent
Iliasevitch

(10) Patent No.: US 8,085,026 B2
(45) Date of Patent: Dec. 27, 2011

(54) CURRENT SENSE CASCODE AMPLIFIER

(75) Inventor: Stepan Iliasevitch, Plano, TX (US)

(73) Assignee: Intersil Americas Inc., Milpitas, CA (US)

( * ) Notice: Subject to any disclaimer, the term of this patent is extended or adjusted under 35 U.S.C. 154(b) by 225 days.

(21) Appl. No.: 12/624,704

(22) Filed: Nov. 24, 2009

(65) Prior Publication Data
US 2010/0127684 A1 May 27, 2010

Related U.S. Application Data

(60) Provisional application No. 61/117,257, filed on Nov. 24, 2008.

(51) Int. Cl.
*G05F 1/575* (2006.01)
*G05F 1/573* (2006.01)

(52) U.S. Cl. ......... 323/285; 323/224; 323/277; 323/315

(58) Field of Classification Search .................. 323/224, 323/277, 282, 284, 285, 315, 316; 327/51, 327/52, 53, 65, 66; 361/87
See application file for complete search history.

(56) References Cited

U.S. PATENT DOCUMENTS

| | | | |
|---|---|---|---|
| 7,050,914 B2 * | 5/2006 | Tzeng et al. | 702/64 |
| 7,777,472 B2 * | 8/2010 | Uehara | 323/284 |
| 7,928,703 B2 * | 4/2011 | Tan et al. | 323/224 |
| 7,994,766 B2 * | 8/2011 | De Lima Filho et al. | 323/282 |

* cited by examiner

*Primary Examiner* — Gary L Laxton
(74) *Attorney, Agent, or Firm* — Gary R. Stanford

(57) ABSTRACT

A current sense amplifier sensing current through a main switch of a converter. The amplifier includes first and second switch devices, an amplifier control circuit, a bias circuit, a current generator circuit, and a sense circuit. The main switch is coupled to an input, phase and control nodes. The first and second switch devices are smaller matching versions of the main switch and are both coupled to the main switch and form first and second nodes. The bias circuit is coupled between second and fourth nodes and the amplifier control circuit is coupled between first and third nodes. The current generator develops a first current through the amplifier control circuit and a second current through the bias circuit. The sense circuit has a current path coupled to the first node and is controlled by the third node to develop a sense voltage indicative of current through the main switch.

20 Claims, 3 Drawing Sheets

CURRENT SENSE CASCODE AMPLIFIER

CROSS-REFERENCE TO RELATED APPLICATIONS

This application claims the benefit of U.S. Provisional Applications Ser. No. 61/117,257, filed on Nov. 24, 2008 which is herein incorporated by reference in its entirety for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
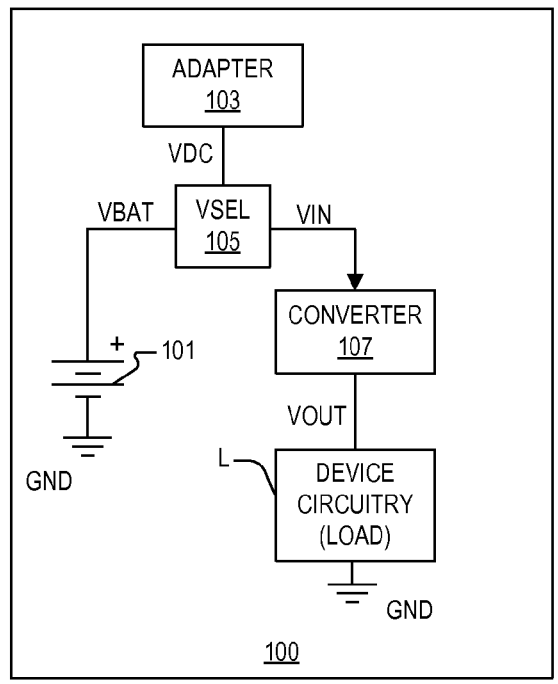
FIG. 1 is a block diagram of an electronic device including a DC-DC switching converter implemented according to an exemplary embodiment.

FIG. 1 is a block diagram of an electronic device 100 including a DC-DC switching voltage converter 107 (otherwise referred to as a regulator or the like) implemented according to an exemplary embodiment. The electronic device 100 includes a battery 101 providing a battery voltage VBAT to one input of a voltage select (VSEL) circuit 105, having another input receiving a DC voltage (VDC) from an adapter 103. The adapter 103 receives voltage from an external power source, such as an alternating current (AC) source (not shown), and converts the received AC voltage to the VDC voltage. If the battery 101 is rechargeable, then the adapter 103 may include a battery charger for charging the battery 101 or a separate battery charger (not shown) may be included. The VSEL circuit 105 provides an input voltage VIN to an input of the converter 107. The converter 107 has an output providing an output voltage VOUT, which is used to provide source voltage to a load L, which generally includes the circuitry of the electronic device 100.

The primary functions of the electronic device 100 are performed by the load L which is the device circuitry in the illustrated configuration. In one embodiment the battery 101 is a rechargeable battery of any suitable type, such as a lithium-ion (Li-ion) battery, nickel-metal hydride (NiMH) battery, a nickel-cadmium (NiCd) battery, etc., used for providing power to an electronic device as understood by those of ordinary skill in the art. When the external power source is not available, the battery 101 provides the power to the device in which the VSEL circuit 105 generally operates to transfer the VBAT voltage as VIN to the converter 107. In an alternative embodiment, the battery 101 may be a non-rechargeable battery, such as any type of dry cell-type, alkaline, carbon-zinc, etc., battery commonly used in portable electronic devices. In various embodiments the voltage of VIN is below VOUT for a boost configuration, VIN is above VOUT for a buck configuration, or VIN relative to VOUT may range anywhere between for various other configurations.

The electronic device 100 represents any type of battery-powered electronic device, including mobile, portable, or handheld devices, such as, for example, any type of personal digital assistant (PDA), personal computer (PC), portable computer, laptop computer, etc., cellular phone, personal media device, etc. The voltage VBAT of the battery 101 may vary within a certain voltage range which depends upon the type of battery and/or the number of battery cells. A Li-ion battery, for example, typically has a voltage range of 3V to 4.2V per cell. It is desired, however, that the voltage VOUT used to provide power to the load L maintain a relatively stable and regulated voltage level. For example, if it is desired that VOUT be maintained at approximately 3.3V with a Li-ion type battery 101 which ranges from 3 to 4.2V, then the converter 107 boosts a lower VIN level and reduces a higher VIN level to maintain VOUT at 3.3V. A current sense device as described herein may be used by any electronic device, whether battery-powered or not, and regardless of the size or application of the device.

Figure 2:
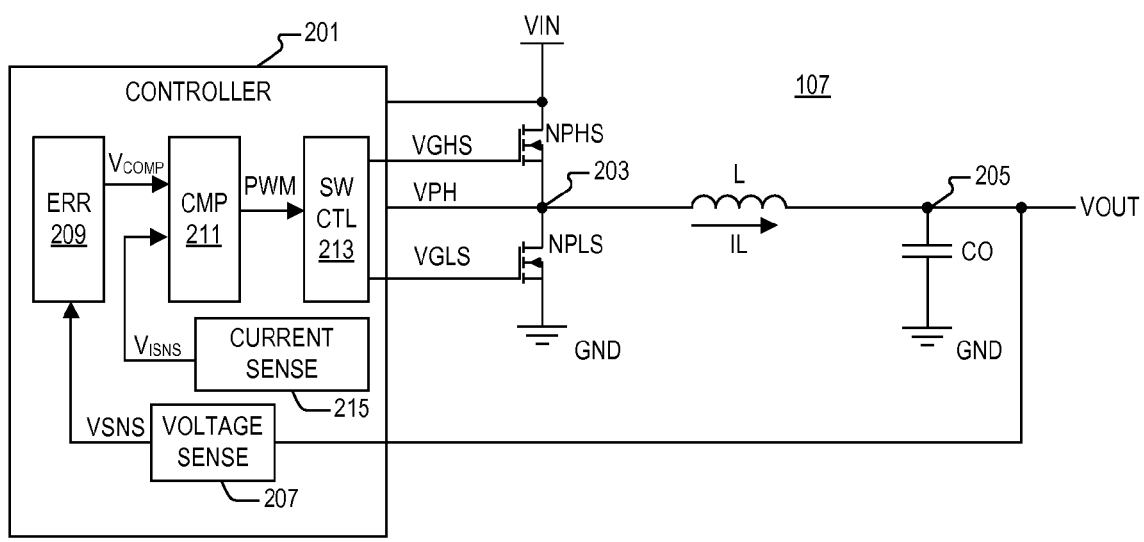
FIG. 2 is a schematic and block diagram of the converter of FIG. 1 implemented according to an exemplary embodiment.

FIG. 2 is a schematic and block diagram of the converter 107 implemented according to an exemplary embodiment. The converter 107 is a current mode buck converter which converts a higher voltage VIN to a lower voltage VOUT. The converter 107 includes a controller 201 which receives VIN and which controls the turn-on and turn-off of a pair of electronic power switching devices or switches NPHS and NPLS. In particular, the controller 201 generates an upper gate switching signal VGHS provided to the control terminal (e.g., gate) of the upper (or high side) switch NPHS and generates a lower gate switching signal VGLS provided to the control terminal of the lower (or low side) switch NPLS. In the particular configuration shown, the switches NPHS and NPLS are depicted as N-channel metal-oxide-semiconductor (NMOS) devices having their drain-source current paths coupled in series between VIN and ground (GND). Other types of electronic switching devices are contemplated, including P-type devices and the like. The drain of switch NPHS is coupled to an input voltage signal VIN and its source is coupled to the drain of switch NPLS at a phase node 203 developing a phase voltage VPH. The source of NPLS is coupled to ground. The phase node 203 is coupled to one end of the output inductor L, having its other end coupled to an output node 205 developing the output voltage VOUT. The current through the output inductor L is shown as IL flowing from phase node 203 to output node 205. The phase node 203 is further coupled to an input of the controller 201 and VOUT (or a sensed version thereof) is provided to another input of the controller 201. An output capacitor CO is coupled between the output node 205 and ground.

The controller 201 includes a voltage sense circuit 207, an error (ERR) circuit 209, a comparator (CMP) circuit 211, a switch control (SW CTL) circuit 213, and a current sense circuit 215. The voltage sense circuit 207 receives VOUT and provides a corresponding output voltage sense voltage VSNS to the error circuit 209. In an alternative embodiment, the voltage sense circuit 207 is externally provided or VOUT is provided directly to an input of the error circuit 209. In one embodiment, the voltage sense circuit 207 is a voltage divider or the like in which VSNS has a voltage level that is proportional to VOUT. The error circuit 209 develops a compensation signal $V_{COMP}$ as understood by those skilled in the art, where $V_{COMP}$ is provided to an input of the comparator circuit 211. The current sense circuit 215 develops a current sense voltage $V_{ISNS}$ representing the current IL flowing through the inductor L, in which $V_{ISNS}$ is provided to another input of the comparator circuit 211. The comparator circuit 211 develops a pulse width modulation (PWM) signal based on $V_{COMP}$ and $V_{ISNS}$, where the PWM signal is provided to an input of the switch control circuit 213. The switch control circuit 213 develops the VGHS and VGLS signals to control switching of the switches NPHS and NPLS as controlled by the PWM signal. Only one of the switches NPHS or NPLS is turned on at any given time (i.e., both are not turned on at the same time). The upper switch NPHS is turned on to couple the VIN to the output inductor L via phase node 203 causing the current IL to increase, and then the upper switch NPHS is turned off and the lower switch NPLS is turned on to couple the inductor L to ground for the remainder of the PWM cycle causing the inductor current IL to decrease. The controller 201 monitors the output voltage VOUT and the current IL to control voltage conversion operation.

Switching DC-DC converters are widely used to efficiently supply power to all blocks of a system. Designers often include a current-sensing feature for short-circuit protection and increased performance. Many designs use sensed inductor current information to optimize the system for high power efficiency and for balance phase loads in multiphase converters. In buck regulators or converters using peak current mode control, inductor current accuracy is important for the loop stability and for the short-circuit protection. It is desired that the current sense circuit 215 in the converter exhibit high speed and high accuracy to achieve relatively high performance with low loss to achieve long battery life. It is further desired that the current sense circuit 215 consume a relatively small area to achieve low cost while also allowing for relatively high voltage of VIN for maximum flexibility. Ideally the current sense circuit 215 develops output sensed current ISNS according to the following equation (1):

$$ISNS = k1*IL + k2*I0 \quad (1)$$

where IL is the sensed current through the inductor L, I0 is a bias current, and k1 and k2 are constants. The first term k1*IL of equation (1) is a scaled inductor current and the second term k2*I0 provides a constant DC offset in order to monitor relatively large negative inductor currents.

Figure 3:
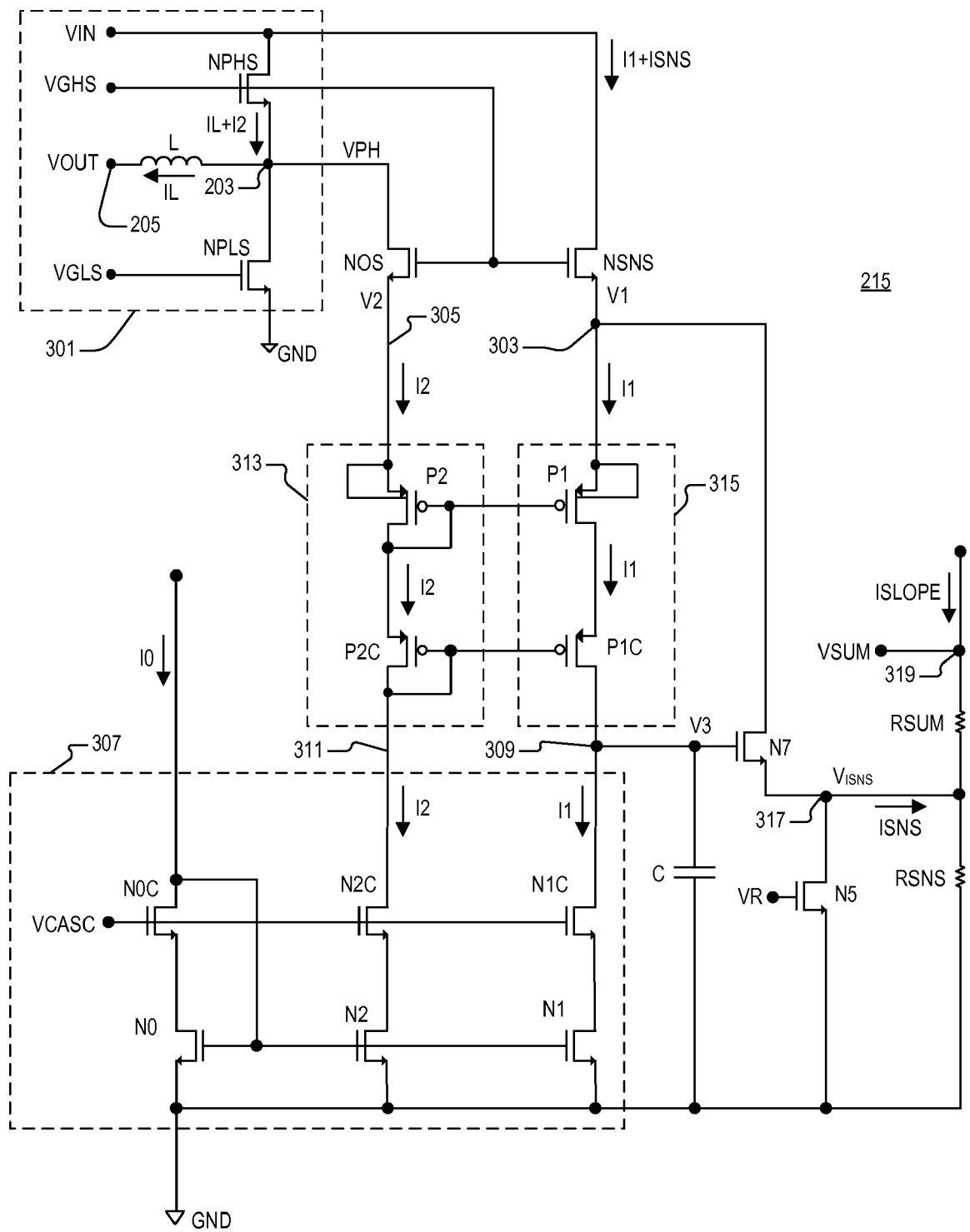
FIG. 3 is a schematic diagram of the current sense circuit of FIG. 2 implemented according to an exemplary embodiment as a current sense cascode amplifier.

FIG. 3 is a schematic diagram of the current sense circuit 215 implemented according to an exemplary embodiment coupled to the switches NPHS and NPLS and the output inductor L. A current IL+I2 flows out of the source of NPHS into the phase node 203. The current sense circuit 215 includes an NMOS sense device NSNS having its drain coupled to VIN and its source coupled to a node 303 developing a voltage V1 and further includes an NMOS offset device NOS having its drain coupled to node 203 and its source coupled to a node 305 developing a voltage V2. NSNS and NOS are matching devices receiving VGHS at their gates and each is the same device type as NPHS. NSNS and NOS are scaled and matched devices similar to the NPHS device yet substantially smaller. Node 303 is the negative input of the current sense circuit 215 which is coupled to VIN through the sense device NSNS and node 305 is its positive input coupled to the phase node 203 through the offset device NOS. The current sense circuit 215 includes a current generator circuit 307 configured as a cascode current mirror, which has an input bias current I0 and which provides 2 output bias currents including a first current I1 at its first output node 309 and a second current I2 at its second output node 311. In one embodiment, the currents I1 and I2 are constant. NMOS devices N0C and N0 are coupled in a current mirror configuration with NMOS devices N1C and N1 developing the current I1 and in another current mirror configuration with NMOS devices N2C and N2 developing the current I2. A bias voltage VCASC is applied to the gates of N0C, N1C and N2C. The gates of N0, N1 and N2 are coupled together and to the drain of N0C. It is desired that I2=2*I1 so that the devices N2C and N2 are about twice the size of the devices N1C and N1.

The first current I1 is supplied via node 309 through a series-connected drain to source paths of PMOS devices P1C and P1 to the source of the sense device NSNS. The second current I2 is supplied via node 311 through the series-connected drain to source paths of diode-connected PMOS devices P2C and P2 to the source of the offset device NOS. The devices P2 and P2C collectively form a bias circuit 313 which forms a left leg of the current sense circuit 215 and which collectively develop the gate voltages for the devices P1 and P1C. The devices P1 and P1C collectively form an amplifier control circuit 315 forming a right leg of the current sense circuit 215. The devices P1 and P1C form a first non-inverting stage of the current sense circuit 215 which is configured as a common gate cascode amplifier. The current densities in both circuits 313 and 315 are approximately the same and I2=2*I1, so that the devices P2C and P2 are about twice the size of the devices P1 and P1C. An NMOS device N7 forms an inverting stage of the amplifier having its drain and source coupled between node 303 and a node 317 and has its gate coupled to the node 309 which develops a voltage V3. A sense current ISNS flows through device N7 and node 317 and through a sense resistor RSNS coupled between node 317 and ground in which node 317 develops the $V_{ISNS}$ voltage in which $V_{ISNS}$=ISNS*RSNS. N7 and RSNS collectively form a sense circuit for developing the $V_{ISNS}$ voltage. A capacitor C is coupled between node 309 and ground. An NMOS device N5 has its drain and source coupled between node 317 and ground and its gate receiving a reset voltage VR. The device N5 switches to reset the voltage on node 317 to ground when VR is asserted. A slope compensation current flows through a resistor RSUM coupled between a node 319 and the node 317 forming a voltage VSUM on node 319 for slope compensation.

In operation of the current sense circuit 215, the inductor current IL is sensed only when VGHS is high causing the devices NPHS, NOS and NSNS to conduct current. At this time the voltages V1 and V2 are both close to the voltage of VIN. The I1 and ISNS currents flow from VIN through device NSNS into node 303. The current generator circuit 307 draws current I1 and the voltage V3 at node 309 develops to control the device N7 in such a manner to keep the input voltages V1 and V2 approximately equal, or V1=V2. The ISNS current flows from node 303 to node 317 through the device N7. The ISNS current is according to the following equation (2):

$$ISNS = IL\left(\frac{NPHS_{RDSON}}{NSNS_{RDSON}}\right) + I2\left(\frac{NPHS_{RDSON} + NOS_{RDSON}}{NSNS_{RDSON}}\right) - I1 \quad (2)$$

where the subscript "RDSON" denotes the drain to source resistance of the indicated device when turned on. Taking into account that $NPHS_{RDSON} \ll NSNS_{RDSON}$, $NOS_{RDSON} = NSNS_{RDSON}$, and $I2=2*I1$, the equation (2) is simplified to the following equation (3):

$$ISNS = IL\left(\frac{NPHS_{RDSON}}{NSNS_{RDSON}}\right) + I1 \quad (3)$$

Equation (3) is according to the form of equation (1) in which k1 is according to the following equation (4):

$$k1 = \frac{NPHS_{RDSON}}{NSNS_{RDSON}} = 1/k \quad (4)$$

where "k" is an aspect ratio of the matched devices NPHS and NSNS, and where "k2" is a cascode current mirror gain in which k2=I1/I0. In this manner, k1 and k2 are practically constant values. The current sense voltage $V_{ISNS}$ is according to the following equation (5):

$$\begin{aligned}V_{ISNS} &= ISNS * RSNS \\ &= IL\left(\frac{NPHS_{RDSON}}{NSNS_{RDSON}}\right)RSNS + I1*RSNS \\ &= IL\left(\frac{RSNS}{k}\right) + I1*RSNS\end{aligned} \quad (5)$$

which may be rewritten in different form according to the following equation (6):

$$V_{ISNS} = IL*RT + VOFFSET \quad (6)$$

Equations (5) and (6) illustrate that the $V_{ISNS}$ voltage is a linear function of the inductor current IL with a coefficient RT and an offset voltage VOFFSET. It is possible to adjust RT and VOFFSET independently by adjusting RSNS and I0.

The current sense circuit 215 achieves relative high speed and accuracy and VIN may be a relatively high input voltage. These characteristics are achieved using a fast, high gain non-inverting common gate cascode amplifier loaded by a cascode current source in a first stage and an inverting device in a second stage. The current sense circuit 215 exhibits low loss in order to achieve relatively long battery life using the existing high side power switch NPHS for current sensing and by using the same bias currents I1 and I2 for both the amplifier itself and for the sense and offset devices NSNS and NOS. The small area for low cost is achieved by using a low count of the amplifier devices.

Figure 4:
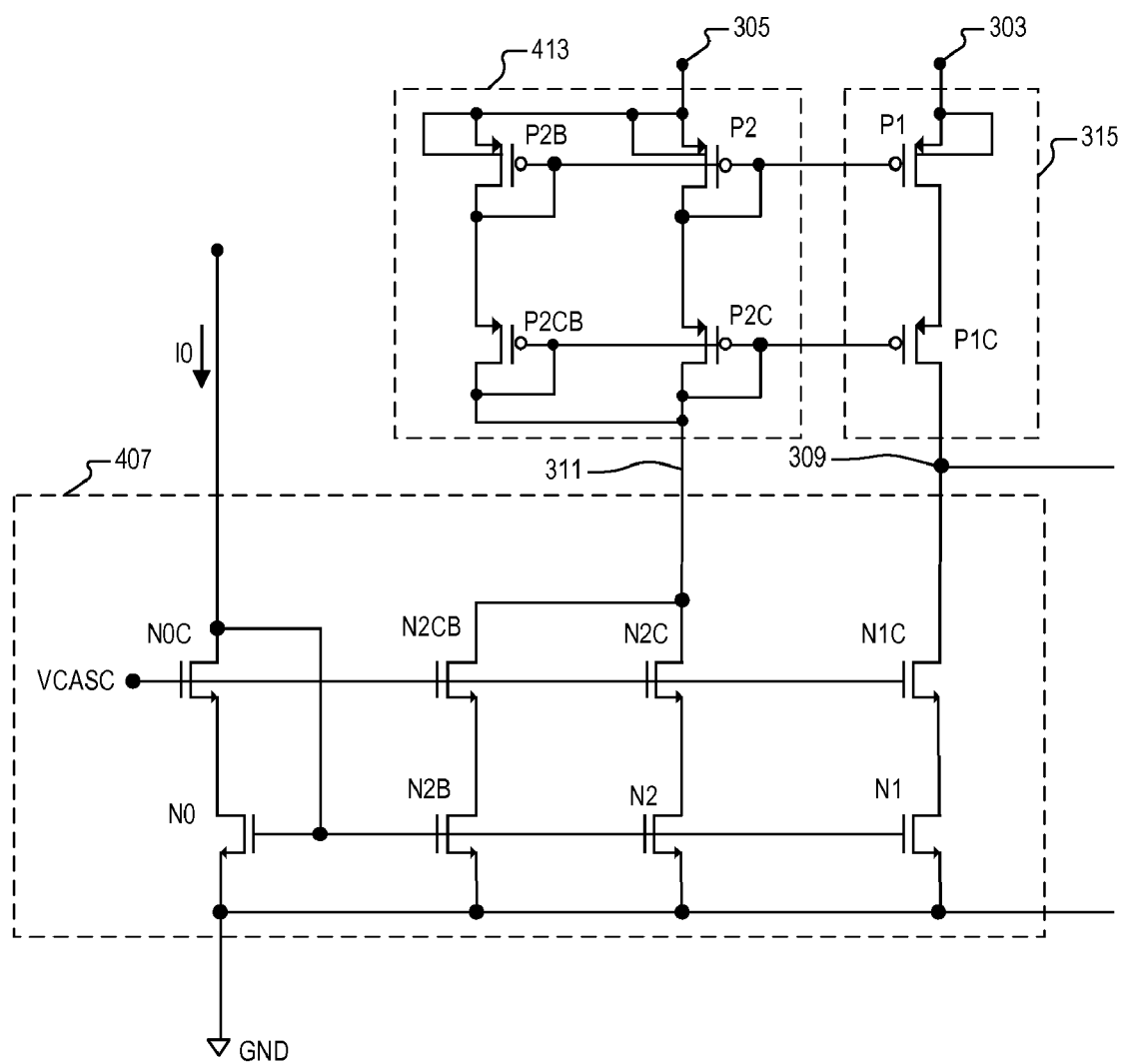
FIG. 4 illustrates an alternative embodiment of the current sense circuit of FIG. 2 in which the left leg of FIG. 3 is replaced with a different leg and in which the current mirror of FIG. 3 is replaced with a different current mirror.

FIG. 4 illustrates an alternative embodiment of the current sense circuit 215 in which the bias circuit 313 is replaced with a bias circuit 413 and in which the current generator circuit 307 is replaced with a current generator circuit 407, also configured as a current mirror. The bias circuit 413 is similar to the bias circuit 313 but further includes diode-coupled PMOS devices P2B and P2CB coupled to the devices P2 and P2C as shown. The current generator circuit 407 is similar to the current generator circuit 307 but further includes NMOS devices N2CB and N2B.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A current sense amplifier for sensing current through a main switch device of a converter, wherein the main switch device has a current path coupled between an input node and a phase node and has a control input coupled to a control node, said current sense amplifier comprising:
   first and second matching switch devices comprising scaled down versions of the main switch device, each said first and second switch device having a control input coupled to the control node, wherein said first switch device has a current path for coupling between the input node and a first node, and wherein said second switch device has a current path for coupling between the phase node and a second node;
   an amplifier control circuit having a current path coupled between said first node and a third node, said amplifier control circuit having an input;
   a bias circuit having a current path coupled between said second node and a fourth node and having an output coupled to said input of said amplifier control circuit;
   a current generator circuit coupled to said third and fourth nodes which develops a constant first current through said amplifier control circuit and which develops a constant second current through said bias circuit, wherein said second current is about twice said first current; and
   a sense circuit having a current path coupled between said first node and ground and having a control input coupled to said third node, wherein said sense circuit develops a sense voltage indicative of current through the current path of the main switch device.

2. The current sense amplifier of claim 1, wherein the main switch device comprises an N-type device having a gate coupled to the control node, a drain coupled to the input node and a source coupled to the phase node, wherein said first and second switch devices comprise N-type switch devices each having a gate for coupling to the control node, wherein said first switch device has a drain for coupling to the input node and a source coupled to said first node, and wherein said second switch device has a drain for coupling to the phase node and a source coupled to said second node.

3. The current sense amplifier of claim 1, wherein:
   said amplifier control circuit comprises first and second P-type devices each having a source and a drain coupled in series between said first and third nodes and each having a gate; and
   wherein said bias circuit comprises third and fourth P-type devices each being diode-coupled and having sources and drains coupled in series between said second and third fourth nodes, wherein said third P-type device has a gate coupled to said gate of said first P-type device and wherein said fourth P-type device has a gate coupled to said gate of said second P-type device.

4. The current sense amplifier of claim 3, wherein said first and second P-type devices are about twice the size of said first and second P-type devices.

5. The current sense amplifier of claim 3, wherein a first current density of said first and second P-type devices is about the same as a second current density of said third and fourth P-type devices.

6. The current sense amplifier of claim 3, wherein said current path of said first switch device develops a current comprising said first current added to a sense current proportional to current flowing through the current path of the main switch device, and wherein said first and second P-type devices operate to control voltage of said third node so that said sense current is directed through said current path of said sense circuit.

7. The current sense amplifier of claim 1, wherein said sense circuit comprises:
an N-type device having a drain coupled to said first node, a source coupled to said fifth node, and a gate coupled to said third node; and
a resistive device coupled between said fifth node and ground.

8. The current sense amplifier of claim 7, wherein said current path of said first switch device develops a current comprising said first current added to a sense current proportional to current flowing through the current path of the main switch device, and wherein said amplifier control circuit operates to control voltage of said third node so that said sense current is directed through said N-type device of said sense circuit.

9. The current sense amplifier of claim 1, wherein said current generator circuit comprises a cascode current mirror circuit.

10. The current sense amplifier of claim 1, wherein said current generator circuit comprises:
a first circuit receiving a bias current and a bias voltage;
a second circuit coupled in a mirror configuration with said first circuit for developing said constant first current; and
a third circuit coupled in a mirror configuration with said first circuit for developing said constant second current.

11. The current sense amplifier of claim 10, wherein:
said first circuit comprises:
a first N-type device having a drain receiving said bias current, a gate receiving said bias voltage, and a source; and
a second N-type device having a drain coupled to said source of said first N-type device, a gate coupled to said drain of said first N-type device, and a source coupled to ground;
wherein said second circuit comprises:
a third N-type device having a drain coupled to said third node, a gate receiving said bias voltage, and a source; and
a fourth N-type device having a drain coupled to said source of said third N-type device, a gate coupled to said drain of said first N-type device, and a source coupled to ground; and
wherein said third circuit comprises:
a fifth N-type device having a drain coupled to said fourth node, a gate receiving said bias voltage, and a source; and
a sixth N-type device having a drain coupled to said source of said fifth N-type device, a gate coupled to said drain of said first N-type device, and a source coupled to ground.

12. An electronic device, comprising:
a voltage converter, comprising:
a first electronic switch having a current path coupled between an input node and a phase node and having a control input coupled to a first power control node;
a second electronic switch having a current path coupled between said phase node and ground and having a control input coupled to a second power control node; and
an inductive device coupled between said phase node and an output node; and
a controller coupled to said first and second control nodes, said phase node and said input node, said controller including a current sense amplifier comprising:
first and second sense devices comprising scaled down versions of said first electronic switch, each said first and second sense device having a control input coupled to said first power control node, wherein said first sense device has a current path coupled between said input node and a first node, and wherein said second sense device has a current path coupled between said phase node and a second node;
a bias circuit having a current path coupled between said second node and a fourth node and having an output;
an amplifier circuit having a current path coupled between said first node and a third node and having an input coupled to said output of said bias circuit;
a current generator circuit coupled to said third and fourth nodes which develops a constant first current through said amplifier control circuit and which develops a constant second current through said bias circuit, wherein said second current is about twice said first current; and
a sense circuit having a current path coupled between said first node and ground and having a control input coupled to said third node, wherein said sense circuit develops a sense voltage indicative of current through the current path of the main switch device.

13. The electronic device of claim 12, wherein said controller further comprises:
a voltage sense circuit having an input coupled to said output node and an output providing a voltage sense voltage;
an error circuit having an input receiving said voltage sense voltage and an output providing a compensation voltage;
a comparator circuit having a first input receiving said compensation voltage, a second input receiving said sense voltage, and an output providing a pulse control signal; and
a switch control circuit having an input receiving said pulse control signal, a first output coupled to said first control node and a second output coupled to said second control node.

14. The electronic device of claim 12, wherein:
said first electronic switch comprises a first N-type device having a gate coupled to said first control node, a drain coupled to said input node and a source coupled to said phase node;
wherein said first sense device comprises a second N-type device which is of a similar type as said first N-type device yet substantially smaller than said first N-type device, wherein said second N-type device has a gate coupled to said first control node, a drain coupled to said input node and a source coupled to said first node; and
wherein said second sense device comprises a third N-type device which matches said second N-type device, wherein said third N-type device has a gate coupled to said first control node, a drain coupled to said phase node and a source coupled to said second node.

15. The electronic device of claim 14, wherein:
said amplifier circuit comprises:
a first P-type device having a gate, a drain and a source wherein said source is coupled to said first node; and
a second P-type device having a gate, having a source coupled to said drain of said first P-type device and having a drain coupled to said third node; and
wherein said bias circuit comprises:
a third P-type device having a source coupled to said second node, and having a gate and drain coupled together and to said gate of said first P-type device; and a fourth P-type device having a source coupled to said gate of said first P-type device, and having a drain and gate coupled to said fourth node and to said gate of said second P-type device.

16. The electronic device of claim 15, wherein said sense circuit comprises:
    a fifth N-type device having a drain coupled to said first node, a gate coupled to said third node, and having a source; and
    a resistive device coupled between said source of said fifth N-type device and ground.

17. The electronic device of claim 12, wherein said current generator circuit comprises a cascode current mirror circuit.

18. The electronic device of claim 12, wherein said voltage converter and controller are provided on a battery-powered electronic hand-held device.

19. A method of sensing current through a main switch device of a voltage converter, wherein the main switch device has a drain coupled to an input node, a source coupled to a phase node and a gate coupled to a control node, said method comprising:
    coupling a gate and a drain of a first switch device to the control node and the input node, respectively, and coupling a source of the first switch device to a first node, wherein the first switch device comprises a scaled down version of the main switch device;
    coupling a gate of a second switch device to the control node, coupling a drain of the second switch device to the phase node, and coupling a source of the second switch device to a second node, wherein the second switch device matches the first switch device;
    coupling a current path of an amplifier circuit between the first node and a third node, wherein the amplifier circuit has a control input;
    coupling a current path of a bias circuit between the second node and a fourth node, and coupling a bias output of the bias circuit to the control input of the amplifier circuit;
    drawing a constant first current through the amplifier circuit and drawing a constant second current through the bias circuit, wherein the second current is about twice the first current;
    coupling a resistive device between a fifth node and ground; and
    coupling a drain of a sense device to the first node, coupling a source of the sense device to the fifth node, and coupling a gate of the sense device to the third node.

20. The method of claim 19, wherein:
    said coupling a current path of an amplifier circuit comprises:
        coupling a source of a first P-type device to the first node, the first P-type device having a gate and a drain; and
        coupling a source of a second P-type device to the drain of the first P-type device, coupling a drain of the second P-type device to the third node, the second P-type device having a gate; and
    wherein said coupling a current path of a bias circuit between the second node and a fourth node, and coupling a bias output of the bias circuit to the control input of the amplifier circuit comprises:
        coupling a source of a third P-type device to the second node, coupling a gate of the third P-type device to the gate of the first P-type device, the third P-type device having a drain; and
        coupling a source of a fourth P-type device to the drain of the third P-type device, coupling a drain of the second P-type device to the fourth node, and coupling a gate of the fourth P-type device to the gate of the second P-type device.

* * * * *